United States Patent
Bennion et al.

[11] Patent Number: 6,018,160
[45] Date of Patent: Jan. 25, 2000

[54] APPARATUS FOR SENSING TEMPERATURE AND/OR STRAIN IN AN OBJECT WITH OPTICAL FIBER BRAGG GRATINGS

[75] Inventors: Ian Bennion, Ravensthorpe; Lin Zhang, Birmingham, both of United Kingdom

[73] Assignee: British Aerospace Public Limited Company, Farnborough, United Kingdom

[21] Appl. No.: 09/040,936

[22] Filed: Mar. 19, 1998

[30] Foreign Application Priority Data

Mar. 22, 1997 [GB] United Kingdom ............... 9705976

[51] Int. Cl.⁷ ........................................... H01J 5/16
[52] U.S. Cl. ........................................ 250/227.14; 356/32
[58] Field of Search ..................... 250/227.14, 227.16, 250/227.19; 385/12, 13; 356/5.12, 5.13, 32, 35; 340/555–557

[56] References Cited

U.S. PATENT DOCUMENTS 5,380,995  1/1995  Udd et al. ........................ 250/227.18
5,534,993  7/1996  Ball et al. ........................... 356/5.09

FOREIGN PATENT DOCUMENTS 2 268 581  1/1994  United Kingdom .

Primary Examiner—Que T. Le
Attorney, Agent, or Firm—Kenyon & Kenyon

[57] ABSTRACT

Apparatus for sensing temperature and/or strain in an object includes a broadband light source (1), connector means (2) in the form of an optical circulator or an optical coupler to which at least two substantially identical optical fiber Bragg gratings (4, 5) are connected. Grating (4) receives the broadband light from the connector means (2) and functions as a sensor of temperature and/or strain in an object. Light is reflected back from the grating (4) to the connector means (2) and then passed to the grating (5) which acts as a reference grating through which a light output signal is transmitted to a detector (8) which is conveniently a photodetector. Means are provided for chirping the two gratings (4, 5) at the same bandwidth and the detector (8) measures the intensity of the received light output signal, with the intensity being monotonically related to the change in temperature and/or strain sensed by the grating (4) in the object.

8 Claims, 4 Drawing Sheets

APPARATUS FOR SENSING TEMPERATURE AND/OR STRAIN IN AN OBJECT WITH OPTICAL FIBER BRAGG GRATINGS

FIELD OF THE INVENTION

This invention relates to apparatus for sensing temperature and/or strain in an object, particularly, but not exclusively suitable for use with objects such as aircraft skins.

BACKGROUND OF THE INVENTION

It has been proposed to use Fiber Bragg Grating (FBG) sensor technology employing optical fibres which may be embedded in or attached to structures, to provide real time strain, temperature and structural integrity information of the structures. The major cost of such technology lies in the interrogation and demultiplexing units for such sensors rather than in the sensors themselves. The majority of the interrogation techniques so far developed have been based on optical filtering methods employing tuneable filters or interferometers which techniques are relatively expensive to implement and relatively cumbersome. It has also been proposed to use matched Fibre Bragg Gratings as a receiving device to track the sensing structures. However this latter method requires the use of a number of expensive piezo-electric actuators to drive the receiving gratings which once again is a relatively expensive technique.

OBJECTS OF THE INVENTION

Thus one object of the present invention is to provide for a generally improved apparatus for sensing temperature and/or strain in an object which is simpler, quicker and more cost efficient than the known apparatus and techniques.

This and other objects and advantages of the present invention will become more apparent from details disclosed in the following specification where preferred embodiments of the invention are described.

SUMMARY OF THE INVENTION

According to the present invention there is provided apparatus for sensing temperature and/or strain in an object, including a source of broadband light, connector means for receiving a beam of broadband light from the source at least two substantially identical optical fibre Bragg Gratings, a first of which gratings is operable to receive the broadband light beam from the connector means and function as a sensor of temperature and/or strain on the object when attached to or forming part of the object, by reflecting part of the receiving light beam back to the connector means, and a second of which gratings is operable to receive from the connector means the reflected light beam part and function as a reference grating through which a light output signal is transmitted, means for chirping said at least two gratings at the same band width, and a detector for receiving the light output signal and measuring the intensity of said light output signal, which intensity is monotonically related to the change in temperature and/or strain sensed in the object.

Preferably the apparatus includes optical fibres for transmitting light between the source, connector means, said at least two gratings and the detector.

Conveniently the source of broadband light is a fluorescent light source.

Advantageously each grating is a Boron/Germania co-doped optical fibre subjected to a two-beam transverse interferometric exposure by ultraviolet light from a continuous wave frequency-doubled argon laser.

Preferably the means for chirping said at least two gratings operates at dissimilar interfering wave fronts.

Conveniently the detector is a photodiode.

Advantageously the connector means is an optical circulator having at least three ports.

Alternatively the connector means is an optical coupler having at least three ports.

DESCRIPTION OF THE DRAWINGS

For a better understanding of the present invention, and to show how the same may be carried into effect, reference will now be made, by way of example, to the accompanying drawings, in which.

DESCRIPTION OF EMBODIMENTS OF THE INVENTION

Figure 1:
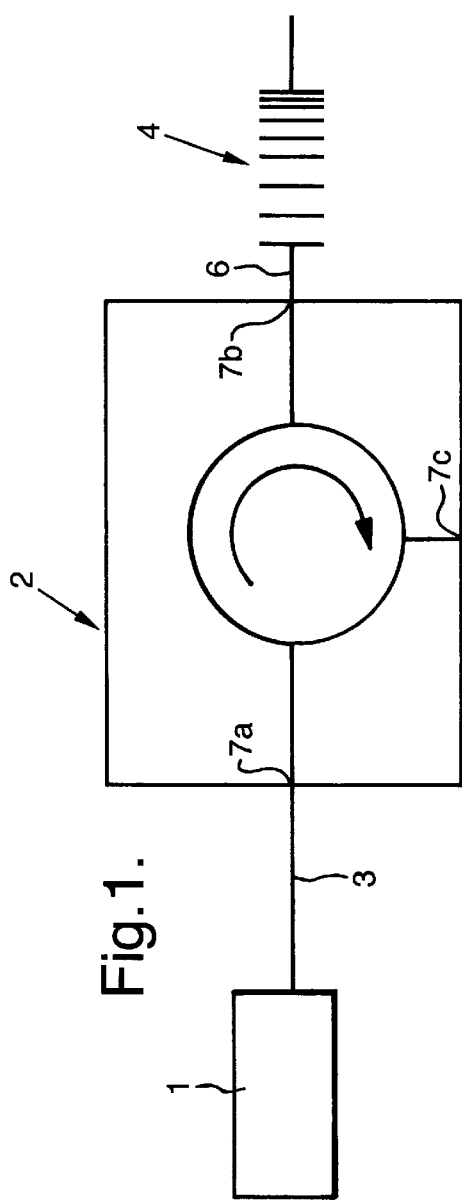
FIG. 1 is a diagrammatic view of apparatus according to a first embodiment of the present invention for sensing temperature and/or strain in an object.
Figure 2:
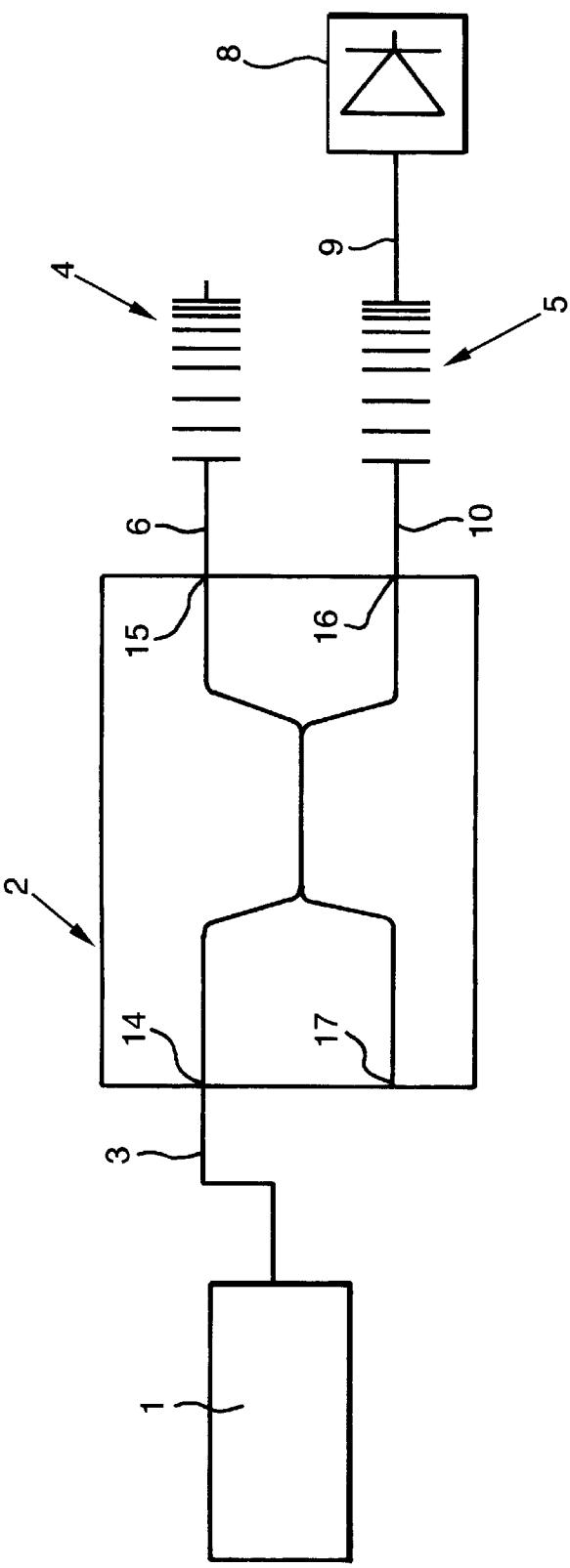
FIG. 2 is a diagrammatic view of a second embodiment of apparatus according to the present invention for sensing temperature and/or strain in an object.

Apparatus according to the present invention for sensing temperature and/or strain in an object is best exemplified by reference to FIGS. 1 and 2 of the accompanying drawings. The apparatus of FIG. 1 will be hereinafter described in more detail. As shown in FIG. 1 the apparatus of the invention includes a source 1 of broadband light which conveniently is a fluorescent light source. A suitable source is a length of erbium doped fibre diode pumped at 980 nm. Connector means generally indicated at 2 are provided for receiving a beam of broadband light from the source 1 via an optical fibre 3. At least two substantially identical optical fibre Bragg gratings 4 and 5 are included with the grating 4 being operable to receive the broadband light beam from the connecting means 2 and to function as a sensor of temperature and/or strain in the object when attached to or forming part of the object, by reflecting part of the received light beam back to the connector means 2 via an optical fibre 6. In the embodiment of FIG. 1 the connector means 2 is an optical circulator having at least three ports 7a, 7b and 7c.

The second grating 5 is operable to receive from the connector means 2 the reflected light beam part and function as a reference grating through which a light output signal is transmitted. Means are provided for chirping the gratings 4 and 5 at the same bandwidth and a detector 8 is provided for receiving the light output signal from the grating 5 via an optical fibre 9 for measuring the intensity of the light output signal. The intensity is monotonically related to the change in temperature and/or strain sensed in the object. A further optical fibre 10 is provided linking the connector means 2 to the grating 5. Preferably the detector 8 is a photodiode as illustrated.

In the embodiment of FIG. 1 light injected into the optical circulator connector means 2 at the port 7a or 7b will be transmitted to the next port in succession or if injected, i.e. reflected back, at the port 7c will be lost. In this way light from the source 1 is directed to the sensor chirped grating 4 and light reflected from this grating re-enters the optical circulator connecting means 2 emerging at the reference grating port 7c. Any light reflected from the reference grating 5 is blocked by the optical circulator connector means 2 and any light transmitted via the grating 5 is measured in intensity by the detector 8.

With the apparatus of the present invention there is a deliberate mismatch of the two identical broadband chirped gratings 4 and 5. This enables direct measurement of strain/temperature encoded in transmitted light intensity from the reference grating 5 and thus eliminates the need for a tuneable filter or piezoelectric tracking system.

Figure 4:
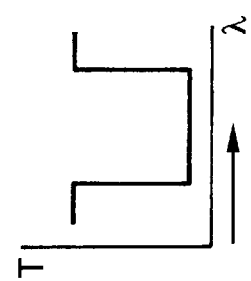
FIG. 4 is a quasi-square reflection profile of a reference grating in the embodiments of FIGS. 1 and 2.
Figure 3:
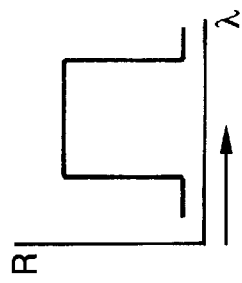
FIG. 3 is a graphical representation of the quasi-square reflection profile of the chirped sensor grating of the embodiments of FIGS. 1 and 2.

The concept of "mismatch" describes the fact that the reference grating 5 acts as a rejection filter. If the profiles of the two gratings 4, 5 are identical then the light received at the photodiode detector 8 will be minimal. When the sensor grating 4 is stretched or heated, its profile is linearly shifted. This results in a fraction of the light reflected from the sensor grating 4 falling outside of the reflection band of the reference grating 5 and being transmitted to the photodiode 8. The quasi-square reflection profiles of these two chirped gratings, as shown in FIGS. 3 and 4, permits a linear relationship between the change in strain/temperature encoded in the Bragg wavelength and bandwidth of the sensor grating 4 and the intensity of the light transmitted from the reference grating 5. The maximum "mismatch", which is given by the chirp rate of both gratings, determines the strain/temperature sensing range of the apparatus.

Figure 6:
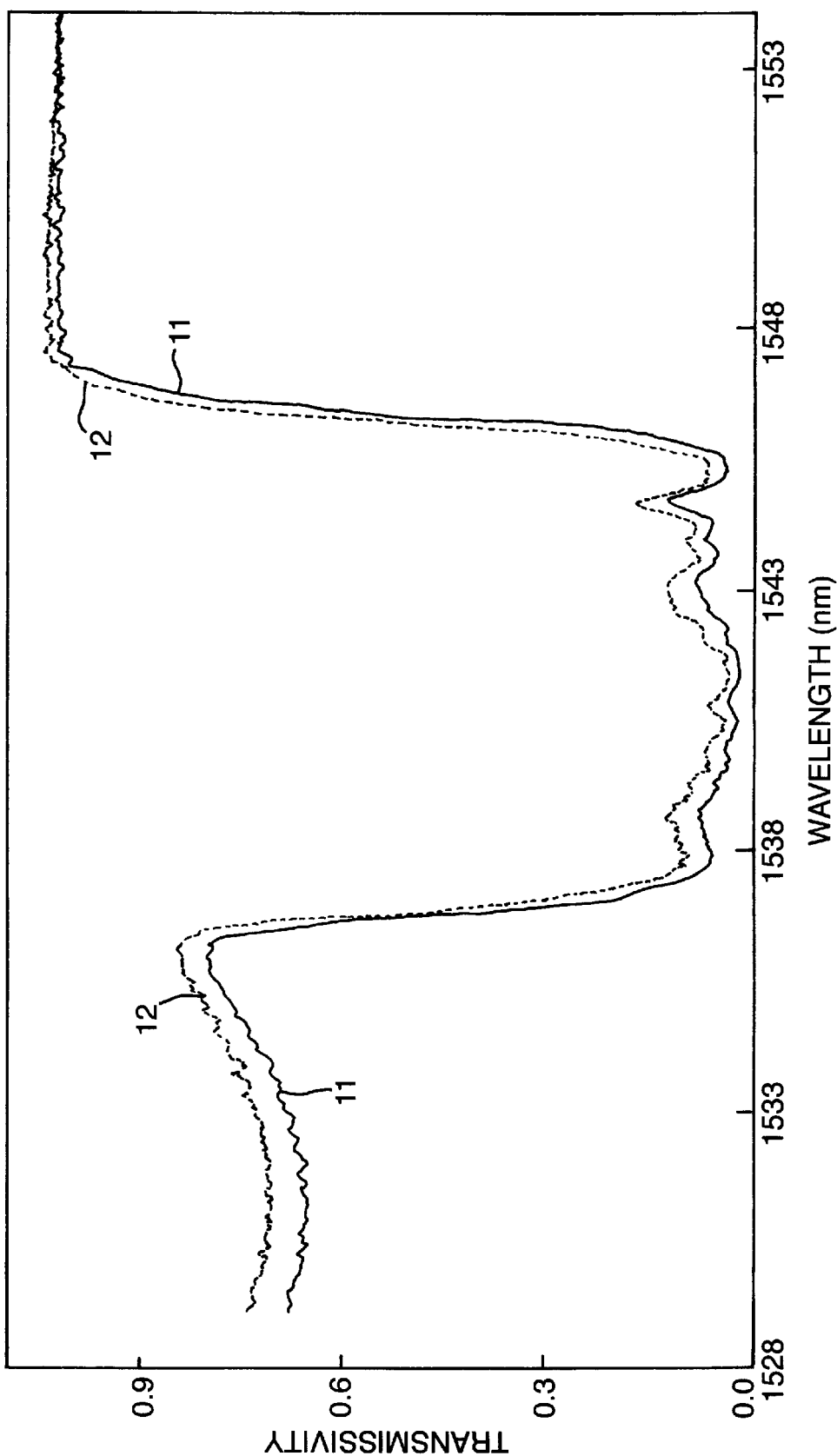
FIG. 6 is a graphical representation of transmissivity versus wavelength showing the transmission spectra of 10 mn chirped sensor and reference gratings in the embodiments of FIGS. 1 and 2.

Apparatus according to the invention was made with sets of identical chirped gratings with a chirp rate 8 of 5 nm and 10 nm respectively. The gratings were fabricated by two-beam transverse interferometric exposure of optical fibre to 244 nm UV light, derived from a continuous wave frequency-doubled argon laser. The optical fibre used was boron/germania co-doped fibre which had been hydrogen-loaded at 150 atmospheres pressure at room temperature for one week prior to exposure. The preferred chirp means utilised a dissimilar interfering wavefronts method. FIG. 6 shows the transmission spectra of two 10 nm bandwidth chirped gratings used in the sensing measurement indicating their nearly "identical" optical responses of which curve 11 represents the sensor grating 4 and curve 12 represents the reference grating 5.

Chirping may be achieved in many ways such as, for example, by substantially linear variation of the optical fibre effective index along a tapered length of optical fibre. Alternatively with a substantially parallel sided optical fibre chirping may be achieved by bending the fibre along its length to vary the effective period of the interference pattern along the longitudinal axis of the fibre, so that the effective fringe separation varies continuously along the fibre. The preferred way is the use of dissimilar interfering wavefronts where the interferring wavefronts have dissimilar curvatures. This can be brought about by the introduction of one or more cylindrical lenses into one or both arms of the interferometer structure.

A continuously chirped grating can be produced by a double exposure technique in which on the first exposure to a UV beam a mask is translated through the beam at constant velocity to photoinduce a linear variation of the effective index into the UV irradiated length of the optical fibre. In a second exposure a uniform pitch phase mask is used to write a grating with uniform fringe spacing into the irradiated length of fibre. A similar result may be achieved by tilting the fibre relative to the phase mask.

Figure 5:
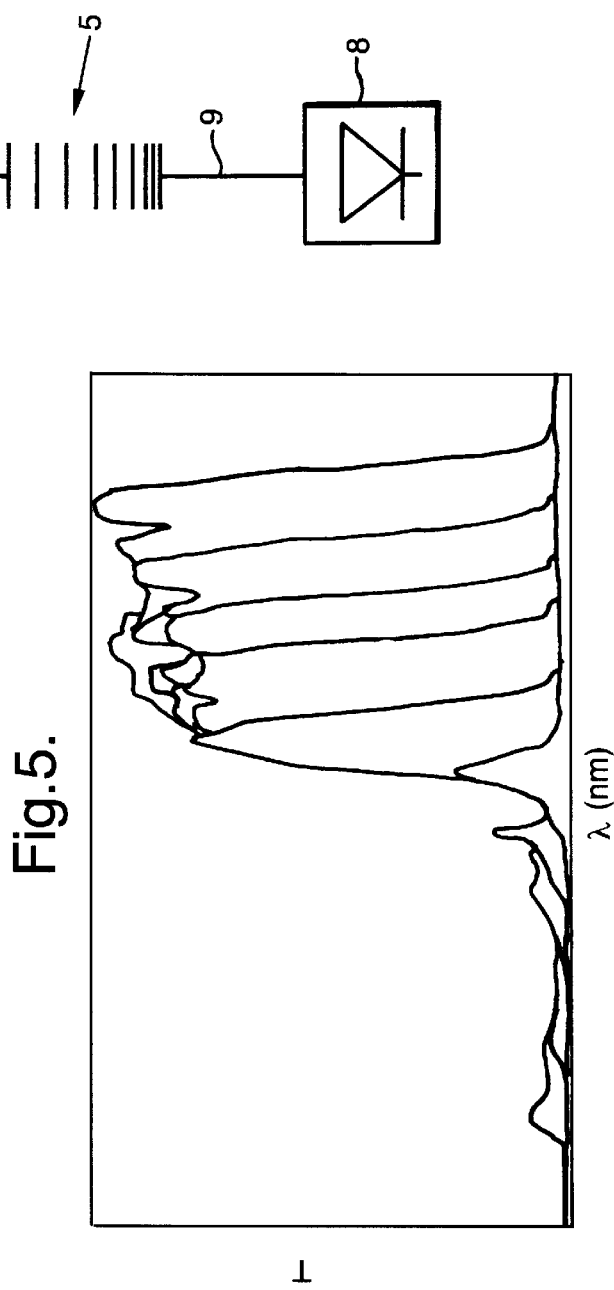
FIG. 5 is a graphical representation of transmitted light against wavelength for light passed through a reference grating in the embodiment of FIGS. 1 and 2 to a detector as measured by an optical spectrum analyser.
Figure 7:
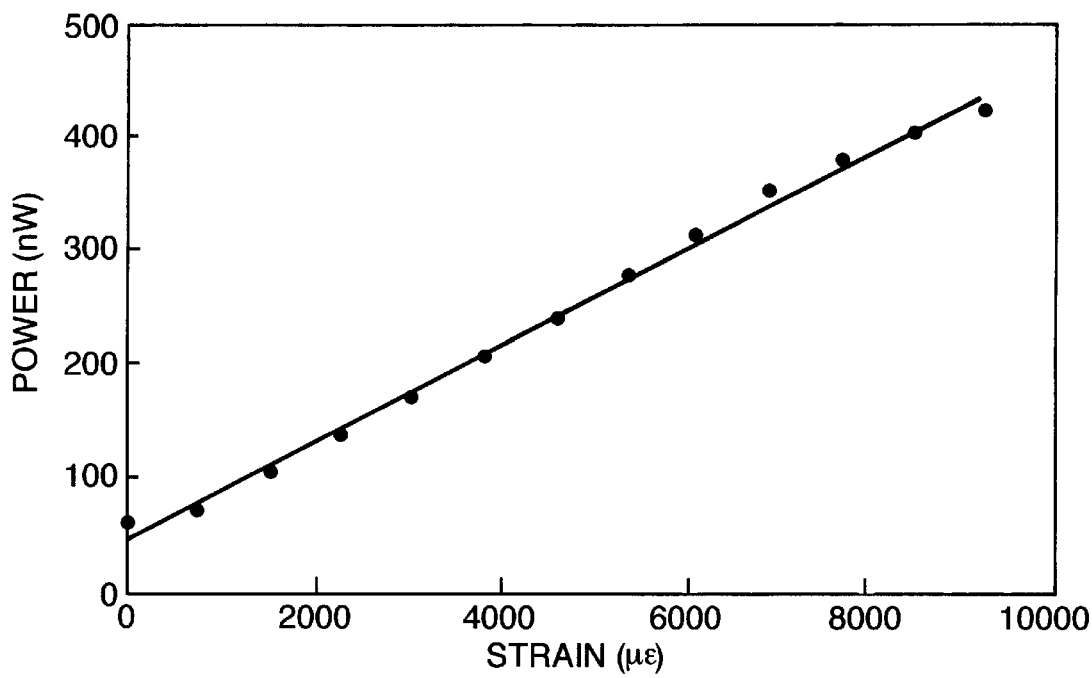
FIG. 7 is a graphical representation of power versus strain showing the response of 10 nm chirped gratings in the embodiments of FIGS. 1 and 2.

To apply strain to the grating 4 the fibre was stripped of its jacket over a 5 nm length at two points 20 cm apart with the grating 4 positioned in the centre. The stripped sections were then bonded to two grooved steel blocks which in turn were mounted onto a load cell and a computer controlled displacement stage. The load cell enabled the zero strain point to be determined and monitored the tension in the fibre. A decrease in tension indicated the fibre slipping inside the adhesive. The fibre was then stretched in steps of 150 $\mu$m, up to 1800 $\mu$m corresponding to 9000 $\mu\epsilon$ strain. FIG. 7 plots the measured light intensity from the photodiode 8 against the strain experienced by the sensor grating 4. The graph shows that good linearity was obtained over the entire sensing range when the grating was chirped at 10 nm. The small variations observed were possibly due to noise at the detector 8 and variations in the system losses, and the offset of the intensity was due to a non 100% reflectivity response of the broadband chirped gratings. FIG. 5 shows the spectra of the light T transmitted by the reference grating 5 displayed on an optical spectrum analyser. As the strain response of this apparatus is of the order 42 pW/$\mu\epsilon$ a photodiode with a resolution of 0.1 nW would give a strain resolution in the order of 5 $\mu\epsilon$.

Figure 8:
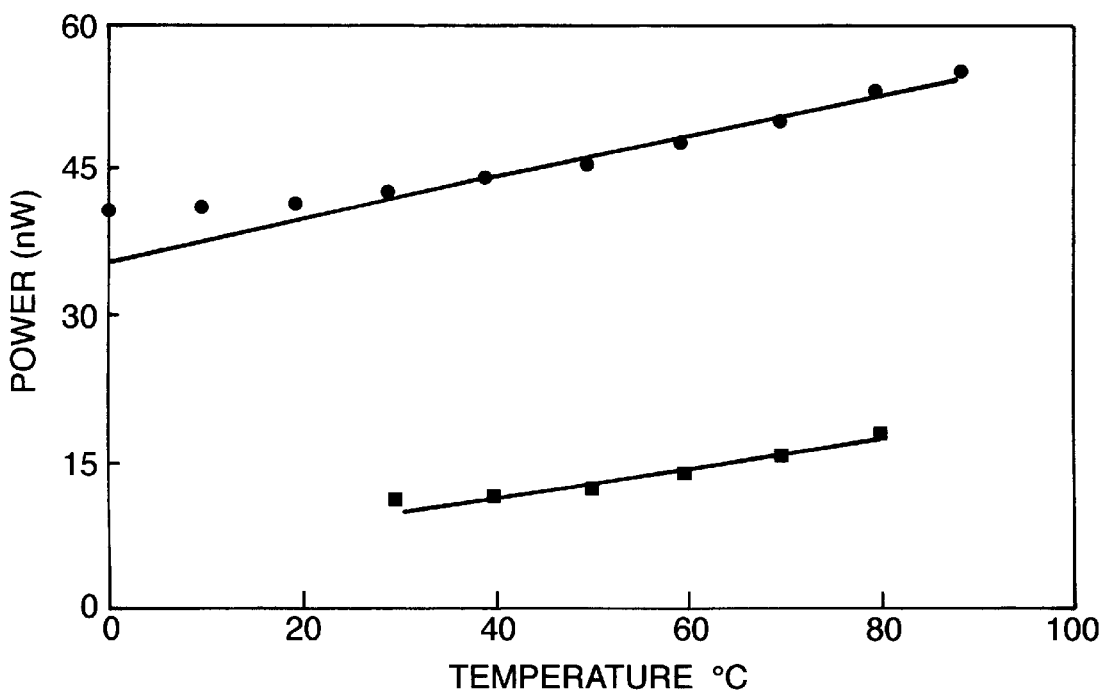
FIG. 8 is a graphical representation of power versus temperature for 10 nm chirped gratings in the embodiment of FIG. 1 and for 5 nm chirped gratings with the embodiment of FIG. 2.

To demonstrate the temperature sensitivity of the apparatus the sensor grating 4 was placed on a Peltier heat pump. To ensure good thermal conduct it was fixed to the Peltier with heat sink compound. It was then cooled to 0° C. FIG. 8 plots the measured light intensity with the temperature in which line 13 shows the temperature to power response of the 10 nm chirped gratings measured with the optical circulator connector means 2. The graph also exhibits a linear response. The seemingly larger deviation is attributable to the fact that the overall shift in Bragg wavelength is approximately 1/10 of that for the strain experiment. A linear fit reveals a temperature response of 0.17 nW/° C. Given this, a photodiode with a resolution of 0.1 nW would offer a temperature resolution better than 1° C.

FIG. 2 of the accompanying drawings shows apparatus according to a second embodiment of the invention which is basically the same as that of FIG. 1 except that the connector means 2 is an optical coupler. Like parts have been given like reference numbers and will not be further described in detail. The temperature sensing experiment was repeated but with the optical coupler connector means of FIG. 2 in place of the optical circulator and two 5 nm chirped gratings (4,5). Broadband light was injected into the coupler on part 14 with the reference and sensor gratings on ports 15 and 16 respectively. Port 17 was terminated in index matching fluid (not shown) to prevent back reflections. Light losses from the coupler based apparatus of FIG. 2 are considerably higher (effective loss of 6 dB as opposed to approximately 1.8 dB for the FIG. 1 embodiment) and the geometry does not provide any isolation between the reference and sensor gratings. However the broad bandwidth of light meant that etalon effects were negligible. The result from this experiment, presented in FIG. 8, indicates that the temperature response from 5 nm gratings as shown by the line 18, changed sign through the total temperature tuning range. This was caused by a slight nonoverlap between the original reflection profiles of the two gratings 4, 5. However, it is possible to eliminate this dual-direction linear response by either deliberately writing the reference grating with a slightly broader reflection profile or stretching it initially to match the sensing grating. The relatively small offset of the optical power at the tuning point suggests that the 5 nm reference grating 5 had a stronger rejection response (higher reflectivity) than the 10 nm reference grating.

The arrangement whereby strain was applied while permitting a full utilisation of the 10 nm bandwidth of the chirped gratings gave a strain sensing range of 9000 $\mu\epsilon$. As the maximum temperature possible using the Peltier heat pump did not exceed 90° C., a large sensing range was not directly obtainable for the temperature experiment. However, the typical values of strain and temperature sensitivities of fibres within 1.5 $\mu$m spectrum are −13 pm/° C. and −1 pm/$\mu\epsilon$. It is thought that a maximum temperature sensing range of 1000° C. for 10 nm chirp is possible. It is conceivable that the "mismatch" of two identical broadband chirped gratings can be effectively employed in monitoring a large change in strain/temperature.

Various modifications and alterations may be made to the embodiments of the present invention described and illustrated, within the scope of the present invention as defined in the following claims.

What is claimed is:

1. Apparatus for sensing temperature and/or strain in an object, including a source of broadband light, connector means for receiving a beam of broadband light from the source at least two substantially identical optical Fiber Bragg gratings, a first of which gratings is operable to receive the broadband light beam from the connector means and function as a sensor of temperature and/or strain on the object when attached to or forming part of the object, by reflecting part of the received light beam back to the connector means, and a second of which gratings is operable to receive from the connector means the reflected light beam part and function as a reference grating through which a light output signal is transmitted, means for chirping said at least two gratings at the same band width, and a detector for receiving the light output signal and measuring the intensity of said light output signal, which intensity is monotonically related to the change in temperature and/or strain sensed in the object.

2. Apparatus according to claim 1, including optical fibres for transmitting light between the source, connector means, said at least two gratings and the detector.

3. Apparatus according to claim 1, wherein the source of broadband light is a fluorescent light source.

4. Apparatus according to claim 3, wherein each grating is a Boron/Germania co-doped optical fibre subjected to a two-beam transverse interferometric exposure by ultraviolet light from a continuous wave frequency-doubled argon laser.

5. Apparatus according to claim 1, wherein the means for chirping said at least two gratings operates at dissimilar interfering wave fronts.

6. Apparatus according to claim 1, wherein the detector is a photodiode.

7. Apparatus according to claim 1, wherein the connector means is an optical circulator having at least three ports.

8. Apparatus according to claim 1, wherein the connector means is an optical coupler having at least three ports.

* * * * *